(12) United States Patent
Maalouf

(10) Patent No.: US 10,908,014 B2
(45) Date of Patent: Feb. 2, 2021

(54) DETECTING ROTOR ANOMALIES DURING TRANSIENT SPEED OPERATIONS

(71) Applicant: General Electric Company, Schenectady, NY (US)

(72) Inventor: Mel Gabriel Maalouf, Minden, NV (US)

(73) Assignee: Baker Hughes, A GE Company, LLC, Houston, TX (US)

( * ) Notice: Subject to any disclaimer, the term of this patent is extended or adjusted under 35 U.S.C. 154(b) by 1223 days.

(21) Appl. No.: 14/465,410

(22) Filed: Aug. 21, 2014

(65) Prior Publication Data
US 2016/0054171 A1    Feb. 25, 2016

(51) Int. Cl.
*G01H 1/00* (2006.01)
*F01D 21/00* (2006.01)
*F01D 21/14* (2006.01)

(52) U.S. Cl.
CPC ........... *G01H 1/006* (2013.01); *F01D 21/003* (2013.01); *F01D 21/14* (2013.01)

(58) Field of Classification Search
CPC ............ G05B 19/4065; G05B 23/0221; G05B 23/0283; G01H 1/003; G01H 1/006; G06Q 50/30; B62D 7/159; B60K 17/06; G01M 13/028; F01D 21/14
USPC ........... 340/683; 702/182, 183, 185; 175/27; 73/660; 180/408, 233; 404/75
See application file for complete search history.

(56) References Cited

U.S. PATENT DOCUMENTS

| 4,559,828 | A | | 12/1985 | Liszka |
| 4,958,698 | A | * | 9/1990 | Kirschner .............. B62D 7/159 |
| | | | | 180/408 |

(Continued)

FOREIGN PATENT DOCUMENTS

| EP | 2 613 019 A2 | 7/2013 |
| WO | 9920992 A2 | 4/1999 |
| WO | 2005 071620 A3 | 10/2005 |

OTHER PUBLICATIONS

EPO Search Report for related application 15179097.9 dated May 9, 2016; 6 pp.

*Primary Examiner* — Regis J Betsch
*Assistant Examiner* — Kaleria Knox
(74) *Attorney, Agent, or Firm* — Mintz Levin Cohn Ferris Glovsky and Popeo, PC; Lisa Adams (57) ABSTRACT

A computing system for detecting anomalies in a rotor during a transient speed operation is provided which includes a first computing device programmed to identify a baseline sample set including a plurality of baseline samples. The computing device collects a plurality of current vibration samples from at least one vibration sensor during the transient speed operation, including a first current vibration sample including a first rotational speed measurement of the rotor and a first vibration measurement. The computing device selects one or more baseline samples from the baseline sample set based at least in part on the first rotational speed. Each baseline sample includes a baseline vibration value. The computing device compares the first vibration measurement to one or more baseline vibration values of the selected one or more baseline samples. The computing device transmits an alert to a monitoring device based at least in part on the comparing.

15 Claims, 7 Drawing Sheets

(56) References Cited

U.S. PATENT DOCUMENTS

| | | | | |
|---|---|---|---|---|
| 5,162,025 | A * | 11/1992 | Carriere | B60K 17/06 |
| | | | | 180/233 |
| 5,258,923 | A * | 11/1993 | Imam | G01H 1/003 |
| | | | | 340/683 |
| 5,748,500 | A | 5/1998 | Quentin et al. | |
| 6,505,143 | B1 * | 1/2003 | Lakshminarasimha | |
| | | | | G05B 19/4065 |
| | | | | 702/183 |
| 6,560,552 | B2 | 5/2003 | Shen et al. | |
| 6,567,709 | B1 | 5/2003 | Malm et al. | |
| 6,714,880 | B2 | 3/2004 | Carle et al. | |
| 7,409,319 | B2 | 8/2008 | Kant et al. | |
| 8,467,949 | B2 | 6/2013 | Kim | |
| 2004/0060347 | A1 | 4/2004 | Comperat et al. | |
| 2007/0124332 | A1 * | 5/2007 | Ballesty | B61L 27/0094 |
| 2008/0156531 | A1 * | 7/2008 | Boone | E21B 7/06 |
| | | | | 175/27 |
| 2010/0256953 | A1 * | 10/2010 | Kar | G05B 23/0221 |
| | | | | 702/185 |
| 2011/0178772 | A1 | 7/2011 | Gerez et al. | |
| 2012/0107045 | A1 * | 5/2012 | DeClerk | E01C 19/236 |
| | | | | 404/75 |
| 2012/0226474 | A1 | 9/2012 | Trejo Sanchez et al. | |
| 2012/0259585 | A1 * | 10/2012 | Haynes | G06Q 50/30 |
| | | | | 702/182 |
| 2012/0274473 | A1 * | 11/2012 | Heda | G01H 1/006 |
| | | | | 340/683 |
| 2013/0167649 | A1 * | 7/2013 | Heda | G01H 1/006 |
| | | | | 73/660 |
| 2013/0179356 | A1 | 7/2013 | Pawlowski et al. | |
| 2014/0114587 | A1 * | 4/2014 | Czerniak | G05B 23/0283 |
| | | | | 702/34 |

* cited by examiner

DETECTING ROTOR ANOMALIES DURING TRANSIENT SPEED OPERATIONS

BACKGROUND

The present disclosure relates generally to rotor monitoring and, more particularly, to using extracted vibration features to monitor a rotor for anomalies.

Vibration analysis is often used to monitor a rotor of a turbine for anomalies. Typically, vibration analysis of a turbine rotor for anomaly detection involves a specialist reviewing vibration measurements obtained from a turbine during full-speed operations. The specialist typically reviews the vibration measurements for changes in vibration to determine the presence of an anomaly. In order to delve further into the severity of the anomaly, the specialist has to manually pull up and analyze all of the information and data obtained during the full-speed operation of the turbine. This is a very time-consuming process to analyze an anomaly condition that does not result in a real-time solution. Sometimes this process can be made even more time-consuming if the specialist believes that it would be necessary to examine frequency data associated with the vibration measurements obtained from the turbine. Typically, turbine units are not deployed with equipment to perform real-time analysis on the frequency associated with vibration measurements, and thus would have to be retrofitted with equipment that can record a full frequency spectrum of vibration measurements.

After retrofitting the turbine with the proper analysis and recording equipment, high resolution data associated with vibration measurements can then be recorded and sent to the specialist for review. The specialist can then analyze this new data along with the vibration measurements that initially precipitated the detection of an anomaly. Again, any solution derived from this process would not be a real-time solution. Another shortcoming with these vibration analysis processes is that only vibration measurements obtained from a turbine operating at full-speed operations are used. Some failure events that result in anomalies cannot be detected using data obtained from a turbine at full-speed operations.

BRIEF DESCRIPTION

In one aspect, a computing system for detecting anomalies in a rotor during a transient speed operation is provided. The computing system includes a first computing device. The first computing device is programmed to identify a baseline sample set. The baseline sample set includes a plurality of baseline samples associated with the rotor. The first computing device is also programmed to collect a plurality of current vibration samples from at least one vibration sensor during the transient speed operation. The plurality of current vibration samples includes a first current vibration sample including a first rotational speed measurement of the rotor and a first vibration measurement. The first computing device is further programmed to select one or more baseline samples from the baseline sample set based at least in part on the first rotational speed. Each baseline sample includes a baseline vibration value. The first computing device is also programmed to compare the first vibration measurement to one or more baseline vibration values of the selected one or more baseline samples. The first computing device is further programmed to transmit an alert to a monitoring device based at least in part on the comparing.

In another aspect, a computer-based method for detecting anomalies in a rotor during a transient speed operation is provided. The method uses a first computing device including a processor and a memory. The method includes identifying, in the memory, a baseline sample set. The baseline sample set includes a plurality of baseline samples associated with the rotor. The method also includes collecting a plurality of current vibration samples from at least one vibration sensor during the transient speed operation. The plurality of current vibration samples includes a first current vibration sample including a first rotational speed measurement of the rotor and a first vibration measurement. The method further includes selecting one or more baseline samples from the baseline sample set based at least in part on the first rotational speed. Each baseline sample includes a baseline vibration value. The method also includes comparing, by the processor, the first vibration measurement to one or more baseline vibration values of the selected one or more baseline samples. The method further includes transmitting an alert to a monitoring device based at least in part on the comparing.

In yet another aspect, at least one non-transitory computer-readable storage media having computer-executable instructions embodied thereon is provided. When executed by at least one processor of a first computing device, the computer-executable instructions cause the processor to identify a baseline sample set. The baseline sample set includes a plurality of baseline samples associated with a rotor. The computer-executable instructions also cause the processor to collect a plurality of current vibration samples from at least one vibration sensor during a transient speed operation of the rotor. The plurality of current vibration samples includes a first current vibration sample including a first rotational speed measurement of the rotor and a first vibration measurement. The computer-executable instructions further cause the processor to select one or more baseline samples from the baseline sample set based at least in part on the first rotational speed. Each baseline sample includes a baseline vibration value. The computer-executable instructions also cause the processor to compare the first vibration measurement to one or more baseline vibration values of the selected one or more baseline samples. The computer-executable instructions further cause the processor to transmit an alert to a monitoring device based at least in part on the comparing.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that may permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital media, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

The methods and systems described herein facilitate anomaly detection during transient speed operations of a rotor device, such as a startup or shutdown sequence of a turbine. In one exemplary embodiment, a monitoring unit (e.g., a computing device with a processor and memory) is mounted to a turbine and communicatively coupled to a plurality of sensors, including vibration sensors and rotor speed sensors. The monitoring unit collects historical vibration samples (i.e., one or more sets of samples) from the turbine during one or more historical transient speed operations. From the historical vibration sample sets, one or more baseline sample sets are identified for use to detect anomalies in future transient speed operations. Each vibration sample in a baseline sample set includes a vibration value and an associated rotational speed of the rotor.

During later use, the monitoring unit collects vibration samples during a current transient speed operation ("current vibration samples"). Each of these current vibration samples includes a current vibration measurement and a current rotational speed measurement. The monitoring unit uses the current rotational speed measurement to identify one or more baseline samples from a baseline sample set. These identified baseline samples generally represent the expected vibration value of the rotor or the turbine at the current rotational speed. The monitoring unit compares the baseline vibration value to the current vibration measurement. If there is a large discrepancy between the baseline and the current measurements, the monitoring unit generates and transmits an alert event to a monitoring system.

Figure 1:
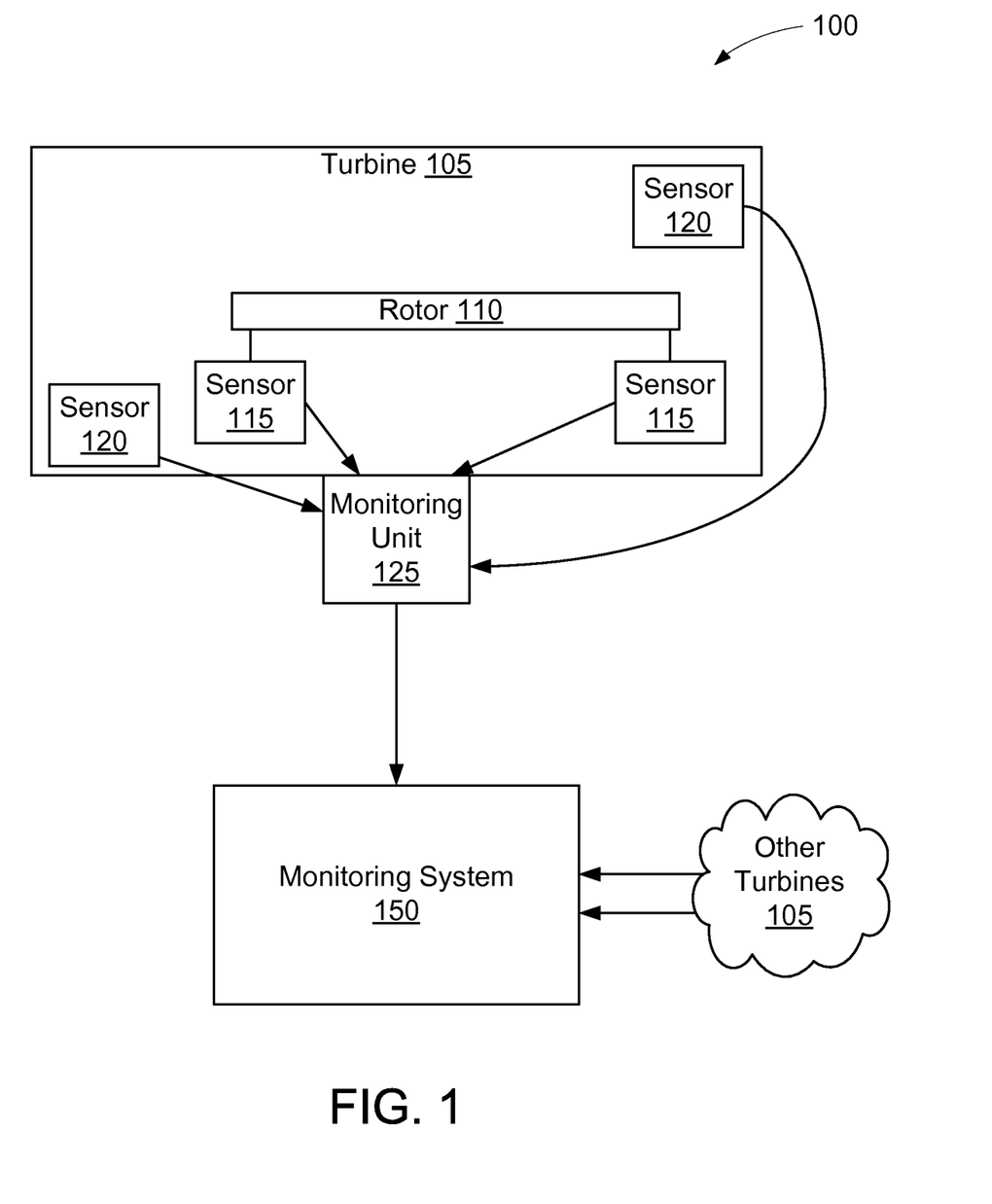
FIG. 1 is a schematic illustration of a turbine rotor monitoring system according to one embodiment of the present disclosure.

FIG. 1 is a schematic illustration of a turbine rotor monitoring system 100 according to one embodiment of the present disclosure. The various embodiments described herein are applicable for use with gas turbines and steam turbines. However, it should be apparent to those skilled in the art and guided by the teachings herein that the present disclosure is likewise applicable to any industrial machinery driven by rotor where it may be desirable to monitor vibration measurements to detect anomalies that arise in operation of the machinery. For example, centrifugal and axial compressors, generators, gear boxes, motors, and pumps are example areas in which the various embodiments of the present disclosure have utility.

In the exemplary embodiment, turbine rotor monitoring system 100 includes a turbine 105 having a rotor 110. At least one vibration sensor 115 is located about rotor 110 to measure vibrations during operation. For clarity, only two vibration sensors 115 are illustrated, however those skilled in the art will recognize that more or less sensors can be used. In one embodiment, vibration sensors 115 may include casing and non-contacting sensors (e.g., accelerometers and proximity sensors). In one embodiment, vibration sensors 115 can be located in the bearing caps that contain bearings that facilitate rotation of rotor 110 during operation of turbine 105.

In the various embodiments of the present disclosure, the vibration measurements obtained from rotor 110 occur during transient speed operations. As used herein, a transient speed operation may include start-up operations, shut-down operations and steady-state operations that occur at speeds that are reached in start-ups and shut-downs of turbine 105.

In the exemplary embodiment, turbine 105 as shown in FIG. 1 further includes one or more operational sensors 120 located about the turbine rotor to measure operational data associated with the turbine. For clarity, only two operational sensors 120 are illustrated, however those skilled in the art will recognize that a typical turbine could have many more sensors located thereabout to measure various operating parameters. Those skilled in the art will recognize that the location of sensors 120 can vary and are not limited to any one particular location. In one embodiment, operational sensors 120 may include speed sensors that measure the speed of rotor 110 during operation. Other sensors could include temperature sensors, pressure sensors, current sensors, etc.

For clarity in explaining the various embodiments of the present disclosure only a few components associated with turbine 105 are illustrated and described herein. Those skilled in the art will appreciate that turbine 105 would have various other components that are not discussed herein.

In the exemplary embodiment, turbine rotor monitoring system 100 further includes one or more monitoring units 125 that monitors the vibration measurements obtained from vibration sensors 115 during the transient speed operation of turbine 105. In some embodiments, monitoring unit 125 communicates alert events, sensor data, and other monitoring data to and from a monitoring system 150. In some embodiments, monitoring system 150 includes one or more computing devices (not shown in FIG. 1) that are on site (e.g., at the same physical location as turbine 105), or off site (e.g., at a location remote from turbine 105), or both.

In one embodiment, monitoring unit 125 executes an algorithm that facilitates continued monitoring and processing of the vibration measurements sent by vibration sensors 115. The algorithm enables monitoring unit 125 to perform operations that include collecting sensor samples including, for example, vibration samples from sensors 115 and rotational speed samples from sensors 120, storing sets of samples as historical sample sets, identifying baseline sample sets from the historical sample sets, receiving new samples from sensors 115 and sensors 120, comparing new samples to baseline sample sets, and generating alerts based on alerting conditions.

As used herein, the term "vibration sample" refers to a set of one or more measurement samples taken from sensors (e.g., sensors 115 and 120) at approximately the same time, or contemporaneous with each other. In some embodiments described herein, a vibration sample includes at least a vibration measurement (e.g., taken from sensors 115) and an associated rotational speed measurement (e.g., taken from sensors 120). For example, each vibration sample may be stored as a list of the one or more measurement samples, such as vibration sample=[r, v, . . . ], where r is a rotational speed measurement, v is a vibration measurement, and other measurements may also be included. Other measurements may include, for example, a temperature at the time of measurement, such as a bearing temperature, and a timestamp taken at the time of measurement. As such, each vibration sample includes a plurality of associated measurement values taken at approximately the same time such that, for example, vibration measurement v can be said to occur at the rotational speed of r. In some embodiments, vibration measurement v is a single component, such as an amplitude or magnitude. In other embodiments, vibration measurement v may include multiple components, such as an amplitude and a phase and gap (e.g., rotor position).

As used herein, the term "sample set" is used to refer to a plurality of samples such as a plurality of vibration samples. As such, the term "historical sample set" is used to refer to a sample set collected in the past (e.g., prior to a current transient state operation), and the term "current samples" is used to refer to samples and/or sample sets collected during the current transient state operation. Further, the term "baseline sample set" is used to refer to a sample set that includes one or more vibration samples and that has been identified as the metric to compare against samples collected from a current transient state operation for purposes of identifying alert conditions, as described in greater detail below. In the example embodiment, each sample set includes a plurality of samples taken during a single transient speed operation. For example, in some embodiments, samples may be collected at every 10 RPMs, or every 10 seconds. In other embodiments, a certain number of samples may be collected over the course of the transient speed operation, such as 300 samples. In still other embodiments, any combination of these sample collection methods may be used.

In some embodiments, vibration measurements may be in units of distance such as, for example, micrometers, or thousandths of an inch (mils). For example, one or more sensors 115 may be proximity probes that measure vibration based on distances from a tip of the probe to a surface of rotor 110. In some embodiments, these vibration measurements may include both an amplitude (e.g., in mils) and a phase (e.g., in degrees of phase lag). In some embodiments, vibration measurements may be direct vibration (e.g., unfiltered or overall vibration). In other embodiments, vibration measurements may be filtered measurements such as, for example, at a frequency of 1×, 2×, or n× of rotor speed (where n is any value), shaft centerline ("gap"), direct, thrust position, and SMAX. Alternatively, any vibration measurement types that enable the systems and methods described herein may be used. In some embodiments, rotational speed measurements may be revolutions per minute (RPM) of, for example, rotor 110.

In one embodiment, one or more baseline vibration sample sets are identified during initial operations of turbine 105. For example, turbine 105 may be initially tested at a factory (e.g., where constructed or assembled) or when initially deployed at an operating site (e.g., where placed into use). During these initial transient speed operation(s), monitoring unit 125 collects one or more startup vibration sample sets and one or more shutdown vibration sample sets. An operator of turbine 105 (e.g., at factory or on site) may examine these historical sample sets and identify one or more of them as baseline sample sets. In one embodiment, an operator at the factory identifies an exemplary startup sample set and an exemplary shutdown sample set as baseline sets prior to shipping turbine 105 to an operational site. Once on site, turbine 105 may again be tested during an on-site startup and/or shutdown, where monitoring unit 125 collects "current" vibration samples and compares the current samples to the baseline sample sets. Any "alertable" deviations from the baseline sample set may be alerted at that time. These initial baseline sample sets may be used during ongoing operational use of turbine 105. The operations of comparing current samples to sample baseline sets is described in greater detail below.

In some embodiments, components of turbine 105, such as rotor 110, may have shifted slightly during transport and, as such, may now routinely generate a different vibration pattern than initially recorded at the factory. An operator may study the current vibration sample set and determine that this new vibration pattern is acceptable. Accordingly, the operator may identify the current vibration sample set as a new baseline sample set and, as such, the current sample set becomes the baseline sample set for future transient speed operations.

Further, in some embodiments, a single baseline sample set may be identified for use with multiple types of transient speed operations, such as a single baseline sample set for both a startup and a shutdown operation. In other embodiments, one baseline sample may be identified for startup operations and another sample may be identified for shutdown operations. In some embodiments, monitoring unit 125 may perform this determination based on differences noticed between one or more startup operations and one or more shutdown operations.

Additionally, in some embodiments, a plurality of baseline sample sets may be identified based on a plurality of vibration measurement types. For example, one baseline sample set may be identified for direct amplitude and another baseline set may be identified for 1× amplitude and phase. These baseline sample sets may be analyzed for alert conditions either separately or in combination.

In other embodiments, one or more initial sample sets may be collected during transient speed operations while turbine 105 is on site. In some embodiments, the operator may identify one or more of the initial sample sets as baseline sample sets. In another embodiment, monitoring unit 125 may select one or more initial sample sets as baseline sample sets. In other embodiments, monitoring unit 125 may designate the last n transient operations sample sets to combine into a baseline sample set.

In some embodiments, monitoring unit 125 may create a baseline sample set from one or more historical sample sets. In one embodiment, monitoring unit 125 selects a subset of vibration samples from a single baseline sample set. For example, monitoring unit 125 may discard several samples taken at similar RPM levels and leave only one to be used as a representative value for that RPM level. In another embodiment, monitoring unit 125 may average a plurality of historical sample sets to create a baseline sample set. For example, and referring to just a single vibration sample for sake of simplicity, presume monitoring unit 125 has three historical sample sets for prior startup operations. Monitoring unit 125 may identify one sample from each of the three historical sample sets that most closely matches each other based on one or more of the sample measurements. For example, monitoring unit 125 may select a sample from each of the three historical sample sets that is closest to 1,000 RPM in rotational speed, thereby identifying 3 samples taken during a startup operation when rotor 110 was rotating at approximately 1,000 RPM (e.g., having a vibration value #1, #2, and #3). Monitoring unit 125 may then average these three vibration values to generate an average vibration value. Monitoring unit 125 may then create a baseline vibration sample that includes [<average vibration value>, 1,000 RPM]. Monitoring unit 125 may perform this averaging operation for a plurality of rotational speeds to generate the baseline vibration sample set.

Some transient speed operations may include one or more speed plateaus, or periods of time during the startup or shutdown in which speed is held relatively constant (i.e., at a "hold speed") for a period of time beginning a "speed hold point." As such, multiple samples may be collected at approximately the same speed value. In some embodiments, these multiple samples may be averaged or otherwise reduced as described above. In other embodiments, these multiple samples may be retained and distinguished from each other based on an additional factor, such as a time since the speed hold point. For example, after reaching a speed hold point, monitoring unit 125 may capture a timestamp at the beginning of the speed hold (i.e., at the speed hold point), and subsequently collect samples every period of time (e.g., every 10 seconds). As such, monitoring unit 125 may use the time since the speed hold point to correlate baseline samples to samples collected during a later transient speed operation.

In some embodiments, some samples may be identified as invalid samples. For example, samples that include values that are much too large or much too small may be excluded from a baseline sample set. In some embodiments, replacement samples may be collected shortly after capture if a particular sample is deemed invalid. One or more of these replacement samples may be inserted into the sample set in lieu of the invalid sample.

After one or more baseline sample sets are identified (e.g., by any of the above-described methods), in the exemplary embodiment, monitoring unit 125 then collects vibration sample data during a subsequent transient speed operation of turbine 105. In other words, monitoring unit 125 collects vibration samples ("current vibration samples", C) during, for example, a startup operation of turbine 105. In some embodiments, monitoring unit 125 collects samples at every 10 RPMs, or every 10 seconds. In other embodiments, a certain number of samples may be collected over the course of the transient speed operation, such as 300 samples. In still other embodiments, any combination of these sample collection methods may be used.

During the course of a transient speed operation such as a startup operation, many vibration samples are collected. Monitoring unit 125 analyzes one or more of these current vibration samples. More specifically, after a current vibration sample $C_i=[v_i, r_i, \ldots]$ (e.g., current vibration measurement, current rotational speed, etc. . . . ) is collected at time i, monitoring unit 125 compares $C_i$ to a baseline set S. Monitoring unit 125 searches baseline set S and identifies one or more samples (e.g., $S_x=[V_x, R_x, \ldots]$) that are similar to $C_i$ based on one or more of the measurements, such as based on rotational speed measurement $r_i$.

For example, presume at time i, vibration measurement of Y and a rotational speed of 1,000.0 RPM was captured from sensors 115 and 120, respectively. In other words, the current sample is:

$$C_i=[Y, 1000.0, \ldots ]).$$

And also presume that the baseline sample set S includes three samples:

$$S_{x-1}=[V_{x-1}, 998.5, \ldots ],$$

$$S_x=[V_x, 999.5, \ldots ], \text{ and}$$

$$S_{x+1}=[V_{x+1}, 1001.5, \ldots ].$$

In the exemplary embodiment, monitoring unit 125 searches baseline set S and identifies the sample having a rotational value nearest the current rotational value (e.g., $r_i=1000.0$). Accordingly, in the example, monitoring unit 125 identifies $S_x$ as the nearest baseline sample to the current sample, since $R_x=999.5$ RPM is closer to 1000.0 RPM than $R_{x+1}=1001.5$ RPM. As such, in this embodiment, baseline sample $S_x$ is identified as a "reference sample" for current sample $C_i$ and, more particularly, baseline value $R_x$ becomes a "reference value," $REF_i$, for the current sample $C_i$.

In some embodiments, a reference value, $REF_i$, is identified by computing a reference value from one or more baseline samples. For example, in one embodiment, the reference value $REF_i$ is computed from the closest n baseline samples, such as the closest three samples. In one embodiment using the closest n baseline samples (e.g., closest 3 samples), monitoring unit 125 averages the vibration measurements of the closest n samples (e.g., $V_{x-1}$, $V_x$, and $V_{x+1}$) to generate the reference value:

$$REF_i = \left(\frac{V_{x-1} + V_x + V_{x+1}}{3}\right). \quad (1)$$

In another embodiment, the reference value $REF_i$ is computed from one or more closest n baseline samples using known methods of interpolation. For example, $REF_i$ may be computed from a lower neighbor and a higher neighbor of the current sample $C_i$ using simple linear interpolation with two points (e.g., $S_x$ and $S_{x+1}$). In other words, to find the interpolation value $REF_i$ of vibration for the RPM value of 1,000.0 RPMs, and presuming $S_x$ is the lower of the two neighbors:

$$REF_i = V_x + (V_{x+1} - V_x)\left(\frac{1000 \cdot 0 - R_x}{R_{x+1} - R_x}\right). \quad (2)$$

As such, the current sample $C_i$ would be paired up with a reference sample of $[REF_i, 1000.0, \ldots]$. Accordingly, the current vibration measurement Y would be compared to the reference value $REF_i$, where $REF_i$ represents an anticipated, expected, or "normal" vibration value for a startup operation at 1,000.0 RPMs, and where Y represents the actual value received from sensors 115 at 1,000.0 RPMs.

In some embodiments, monitoring unit 125 may compute a median of several samples. In other embodiments, monitoring unit 125 may weight sample sets against each other to determine the reference samples.

In the exemplary embodiment, after identifying the reference sample to associate with current sample $C_i$, monitoring unit 125 compares the current sample $C_i$ to the reference sample. Monitoring unit 125 may perform this comparison in several different ways.

In some embodiments, monitoring unit 125 compares the current sample $C_i$ to the associated reference sample by computing a difference, $\Delta_i$, between the reference value $REF_i$ (e.g., from the baseline) and the current vibration measurement Y. In some embodiments, this difference value $\Delta_i$ is compared to one or more of an upper threshold value, a lower threshold value, and a range defined by an upper threshold value and a lower threshold value. In other embodiments, these threshold values are expressed in terms of absolute values of vibration measurement from the reference values, rather than a difference in vibration measurements between the reference values and the threshold values. These threshold values, generally speaking, distinguish between an "acceptable" sample and an "out-of-bounds" sample. In other words, a current vibration measurement below an upper threshold is acceptable, or above a lower threshold is acceptable, or between an upper and a lower threshold is acceptable. In some embodiments, these threshold values may be computed from pre-defined tolerance settings. For example, in some embodiments, these threshold values may be a pre-defined amount above or below the reference value $REF_i$ (e.g., a tolerance setting of ±1.0 mils peak to peak). In other embodiments, these threshold values may be a pre-defined percentage of $REF_i$ above or below the reference value $REF_i$ (e.g., a tolerance setting of ±10.0%). In other embodiments, these threshold values may be a set of pre-defined values for a given measurement type, such as for a given rotational speed. For example, a threshold value set, Q, based only on upper thresholds, may define an upper threshold at 1,000.0 RPMs of $Q_{1,000.0}$ (and similarly for other RPMs). For each of the above embodiments, if monitoring unit 125 determines that the current sample $C_i$ is an "out-of-bounds" sample, then this sample is referred to herein as an "alert candidate."

In some embodiments, if a single current sample is determined to be an alert candidate, then an alert notification is generated and transmitted from monitoring unit 125 to monitoring system 150. In the example embodiment, monitoring unit 125 and/or monitoring system 150 performs persistence analysis on samples to determine notification alerting. For example, multiple consecutive out-of-bounds samples may be collected before an alert is generated, or the out-of-bound condition may need to occur for a certain length of time (e.g., 3 seconds) or for a certain change in RPMs (e.g., 100 RPMs) before an alert is generated.

It should be understood that, while the systems and methods described herein are generally recited in the examples as being performed when turbine 105 is on site at a power generation location, these systems and methods may be performed at any other location, such as at the factory during pre-shipping testing.

In some embodiments, once the transient speed operation is complete, some or all of current sample set C may be transmitted from monitoring unit 125 to monitoring system 150. Further, data associated with the analysis of the current sample set C by monitoring unit 125 may also be transmitted to monitoring system 150. Monitoring unit 125, in the example embodiment, is a networked device in TCP/IP communication with monitoring system 150.

Figure 2:
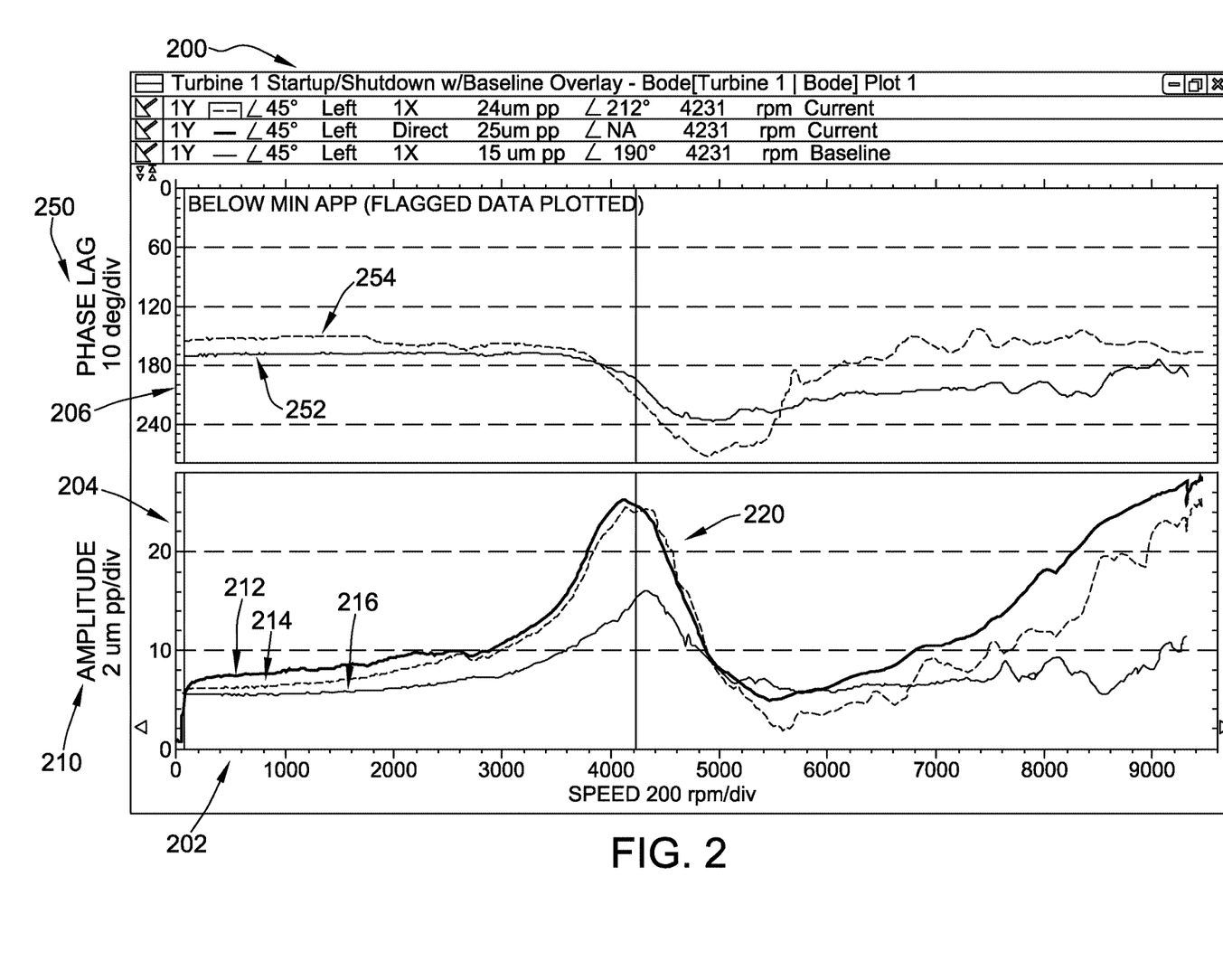
FIG. 2 is an exemplary Bode plot of a transient speed operation for a machine such as turbine shown in FIG. 1.

FIG. 2 is an exemplary Bode plot 200 of a transient speed operation for a machine such as turbine 105 (shown in FIG. 1). In the exemplary embodiment, plot 200 includes an magnitude plot 210 and a phase plot 250. The X-axis 202 of plot 200 represents rotational speed of a rotor such as rotor 110, in units of revolutions per minute (RPM). The Y-axis 204 of magnitude plot 210 represents 1× amplitude in micrometers. The Y-axis 206 of the phase plot 250 represents 1× phase lag in degrees.

The magnitude plot 210 includes a baseline 1× amplitude and phase trace 216, which represents a baseline sample set of 1× amplitude identified from one or more past historical sample sets as described above in reference to FIG. 1. The magnitude plot 210 also includes a present 1× amplitude and phase trace 214 plotted against speed, which represents the current sample set C in 1× amplitude and phase collected during the present transient speed operation. The magnitude plot 210 further includes an overall trace 212, which represents the overall vibration plotted against speed.

The phase plot 250 includes a baseline 1× phase trace 252, which represents another baseline sample set of 1× phase identified from one or more past historical sample sets as described above in reference to FIG. 1. The phase plot 250 also includes a current 1× phase trace 254, which represents the current sample set C in 1× phase collected during the present transient speed operation.

Based on the plot data in magnitude plot 210, the turbine exhibits a natural resonance peak 220 at around 4,200 RPM. Further, at and around peak 220, the current 1× amplitude (e.g., trace 214) is registering considerably above the baseline. For example, presume monitoring unit 125 (shown in FIG. 1) identified and associated a current 1× amplitude measurement of 24 micrometers (μm) peak to peak at 4,231 RPM and associated that sample with a baseline (e.g., historical) 1× amplitude sample of 15 μm at 4,231 RPM. In some embodiments, this difference of 9 μm may be identified as an alertable event.

Figure 3:
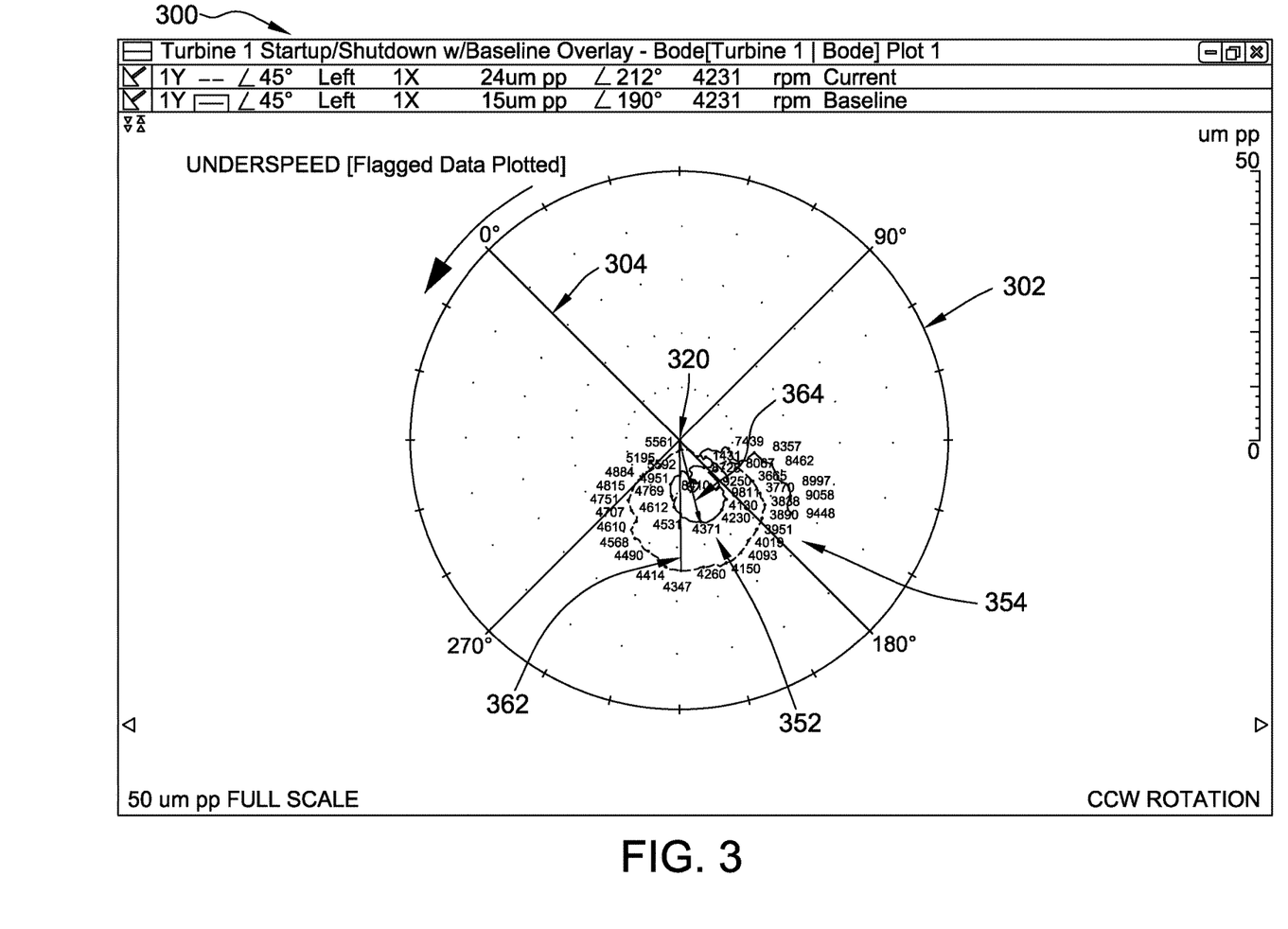
FIG. 3 is an exemplary polar plot of a transient speed operation for a machine such as turbine shown in FIG. 1.

FIG. 3 is an exemplary polar plot 300 of a transient speed operation for a machine such as turbine 105 (shown in FIG. 1). In the exemplary embodiment, plot 300 includes both a baseline 1× trace 352 and a current 1× trace 354 that integrates both amplitude and phase measurements of a baseline sample set and a current sample set, respectively. A circumferential axis 302 is expressed in degrees, and a radial axis 304 is expressed as an amplitude, in micrometers (μm), from a center point 320. The RPM associated with each of the several illustrated points on each trace 352 and 354 is expressed as the integer near the point, with the angle of the respective point indicating the associated phase (e.g., as defined by phase lines 362, 364 defined from center point 320).

In the exemplary embodiment, presume monitoring unit 125 identified and associated a current 1× sample of 24 micrometers (μm) and 212 degrees at 4,231 RPM and associated that sample with a baseline (e.g., historical) 1× sample of 15 μm and 190 degrees at 4,231 RPM. In some embodiments, the difference of 9 μm, the difference of 22 degrees phase, and/or some combination of the two, may be identified as alertable event(s).

Figure 4:
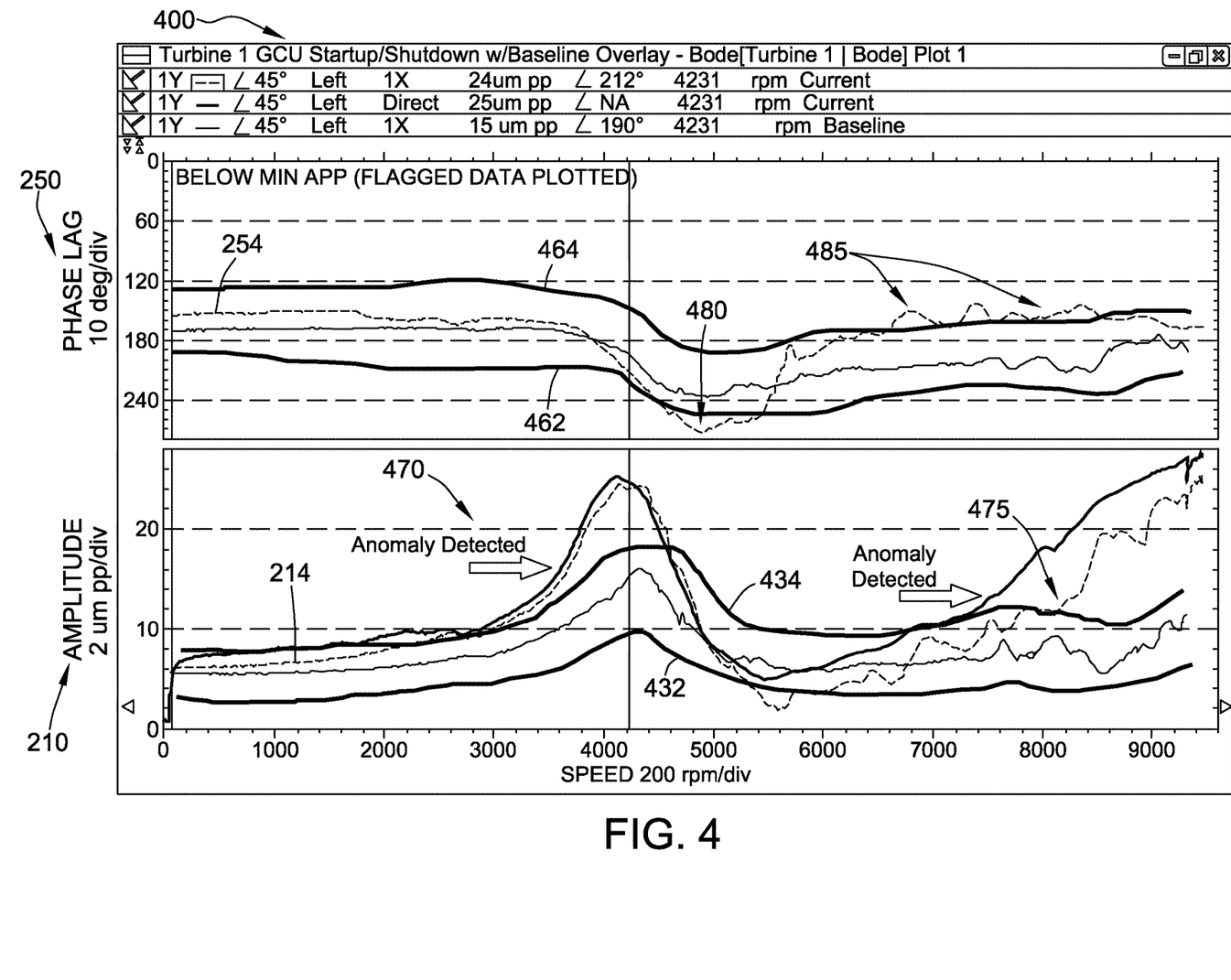
FIG. 4 is another exemplary Bode plot of a transient speed operation for a machine such as turbine shown in FIG. 1.

FIG. 4 is another exemplary Bode plot 400 of a transient speed operation for a machine such as turbine 105 (shown in FIG. 1). In the exemplary embodiment, plot 400 is similar to bode plot 200 (shown in FIG. 2). Some elements common to both plots 200 and 400 are not numbered in FIG. 4 for clarity purposes, while other elements are numbered using like reference numbers.

Magnitude plot 210, as illustrated in FIG. 4, includes a 1× amplitude lower threshold 432 and a 1× amplitude upper threshold 434. Further, phase plot 250 includes a 1× phase lower threshold 462 and a 1× phase upper threshold 464. In some embodiments, lower thresholds 432, 462 and upper thresholds 434, 464 are sample sets pre-computed from one or more baseline sample sets. In other embodiments, lower thresholds 432, 462 and upper thresholds 434, 464 are determined during analysis of a current transient speed operation and are thus representative of a combination of one or more baseline sample sets in combination with threshold settings relative to baseline samples. Lower thresholds 432, 462 and upper thresholds 434, 464 may be used individually (e.g., to define a single threshold) or in paired combination (e.g., to define a range bounded by a lower and an upper threshold).

In the exemplary embodiment, when the current sample set (represented by traces 214 and 254) deviates outside of the threshold range defined by, for example, lower threshold 432 and upper threshold 434, monitoring unit 125 (shown in FIG. 1) generates alert events. For example, an anomaly 470 is detected during the RPM range of approximately 3,000 RPM-4,600 RPM because, during this traverse up or down in RPM, the current vibration measurements represented by trace 214 exceed upper threshold 434. Similarly, another anomaly 475 is detected at RPMs above approximately 8,100 RPM. In some embodiments, phase anomalies 480 and 485 are similarly monitored and detected by monitoring unit 125 as well.

Figure 5:
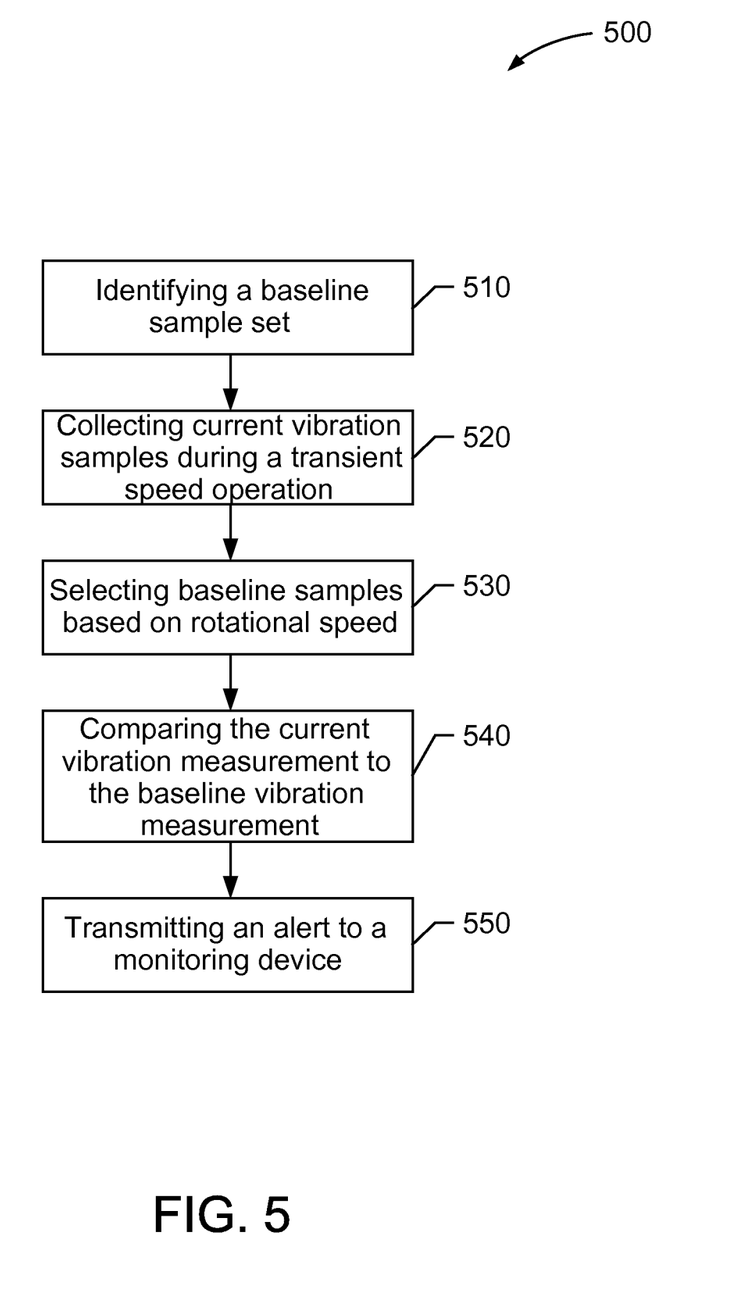
FIG. 5 is an exemplary method for detecting rotor anomalies during transient speed operations using the monitoring unit shown in FIG. 1.

FIG. 5 is an exemplary method 500 for detecting rotor anomalies during transient speed operations using monitoring unit 125 (shown in FIG. 1). In some embodiments, method 500 may be implemented by monitoring unit 125 (shown in FIG. 1) and/or computing device 620 (shown in FIG. 6). In the exemplary embodiment, method 500 includes identifying 510, in the memory, a baseline sample set, wherein the baseline sample set includes a plurality of baseline samples associated with the rotor. In some embodiments, identifying 510 a baseline sample set includes identifying a historical sample set as the baseline sample set, wherein the historical sample set includes a plurality of historical vibration samples of the rotor during a past transient speed operation. In other embodiments, identifying 510 a baseline sample set includes computing the baseline sample set from a plurality of historical sample sets, wherein the historical sample set includes a plurality of historical vibration samples of the rotor during a past transient speed operation. In still other embodiments, identifying 510 a baseline sample set includes receiving, from an operator of the first computing device, an indication of a historical sample set as the baseline sample set, wherein the historical sample set includes a plurality of historical vibration samples of the rotor during a past transient speed operation.

In the exemplary embodiment, method 500 includes collecting 520 a plurality of current vibration samples from at least one vibration sensor during the transient speed operation, the plurality of current vibration samples including a first current vibration sample including a first rotational speed measurement of the rotor and a first vibration measurement.

Method 500, in the exemplary embodiment, includes selecting 530 one or more baseline samples from the baseline sample set based at least in part on the first rotational speed, each baseline sample including a baseline vibration value. In some embodiments, each baseline sample further includes a baseline rotational speed, and selecting 530 one or more baseline samples further includes identifying a first baseline sample from the baseline sample set having a baseline rotational speed nearest to the first rotational speed.

In the exemplary embodiment, method 500 also includes comparing 540, by the processor, the first vibration measurement to one or more baseline vibration values of the selected one or more baseline samples and transmitting 550 an alert to a monitoring device based at least in part on the comparing. In some embodiments, comparing 540 the first vibration measurement to one or more baseline vibration measurements further includes averaging the one or more baseline vibration measurements to generate a baseline average, and comparing the first vibration measurement to the baseline average. In other embodiments, the first vibration measurement includes a first amplitude measurement and a first phase measurement, and each baseline vibration value includes a baseline amplitude value and a baseline phase value, and comparing 540 the first vibration measurement to one or more baseline vibration values further includes comparing the first amplitude measurement to the baseline amplitude value, and comparing the first phase measurement to the baseline phase value.

Figure 6:
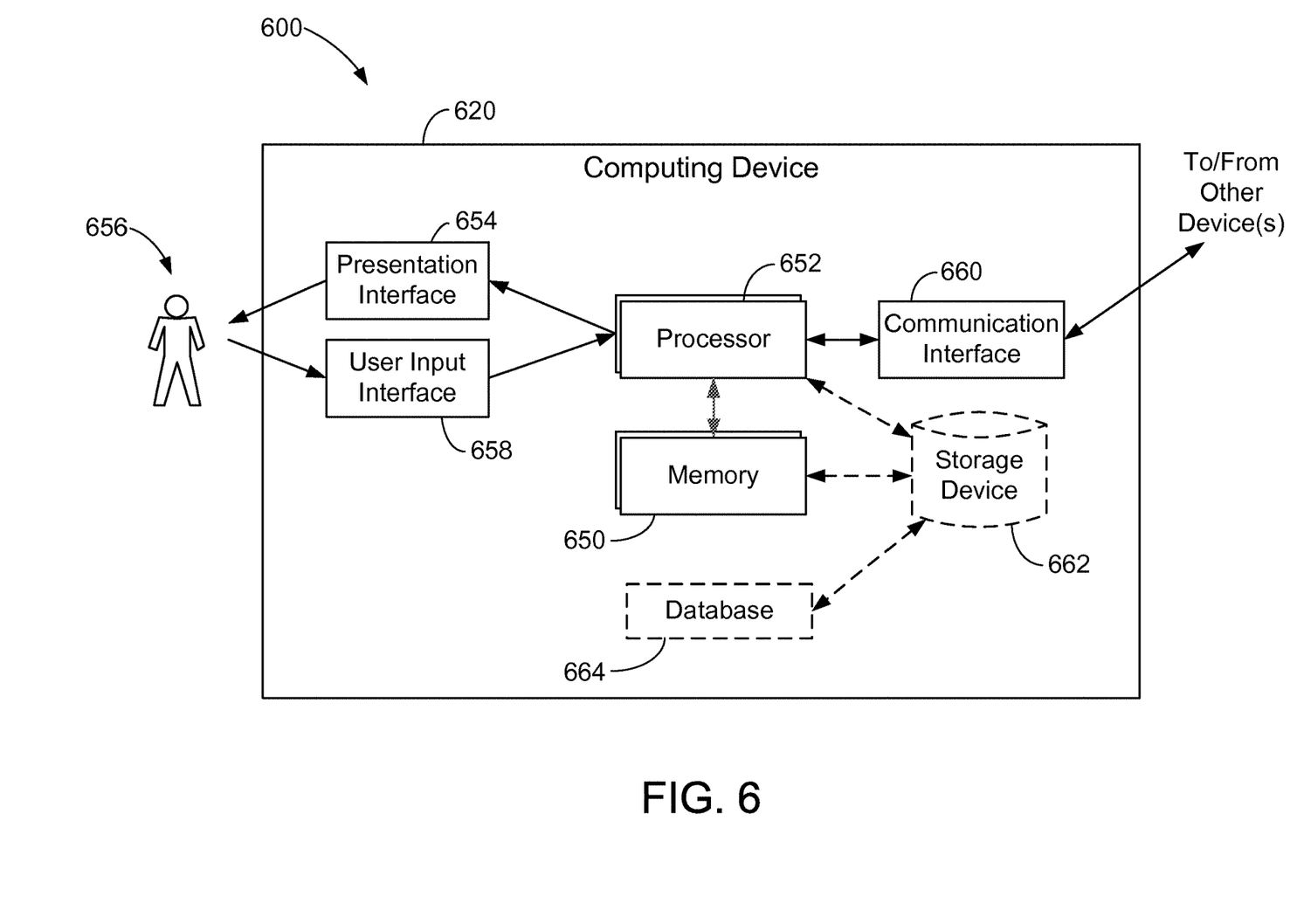
FIG. 6 is a block diagram of an exemplary computing system that may be used to detect rotor anomalies during transient speed operations of machinery such as, for example, the turbine shown in FIG. 1.

FIG. 6 is a block diagram 600 of an exemplary computing system 620 that may be used to detect rotor anomalies during transient speed operations of machinery such as, for example, turbine 105 (shown in FIG. 1). In some embodiments, computing system 620 may be monitoring device 125 (shown in FIG. 1) and/or monitoring system 150 (shown in FIG. 1). Alternatively, any computer architecture that enables operation of computing system 620 as described herein may be used.

In the exemplary embodiment, computing system 620 includes a memory device 650 and a processor 652 operatively coupled to memory device 650 for executing instructions. In some embodiments, executable instructions are stored in memory device 650. Computing system 620 is configurable to perform one or more operations described herein by programming processor 652. For example, processor 652 may be programmed by encoding an operation as one or more executable instructions and providing the executable instructions in memory device 650. Processor 652 may include one or more processing units, e.g., without limitation, in a multi-core configuration.

Further, in the exemplary embodiment, memory device 650 is one or more devices that enable storage and retrieval of information such as executable instructions and/or other data. Memory device 650 may include one or more tangible, non-transitory computer-readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or nonvolatile RAM (NVRAM) memory. The above memory types are exemplary only, and are thus not limiting as to the types of memory usable for storage of a computer program.

Also, in the exemplary embodiment, memory device 650 may be configured to store a variety of monitoring data associated with turbine 105 such as, for example, baseline sensor samples and sample sets, historical sample sets, settings, and current sensor samples.

In some embodiments, computing system 620 includes a presentation interface 654 coupled to processor 652. Presentation interface 654 presents information, such as a user interface and/or an alarm, to a user 656. For example, presentation interface 654 may include a display adapter (not shown) that may be coupled to a display device (not shown), such as a cathode ray tube (CRT), a liquid crystal display (LCD), an organic LED (OLED) display, and/or a hand-held device with a display. In some embodiments, presentation interface 654 includes one or more display devices. In addition, or alternatively, presentation interface 654 may include an audio output device (not shown), e.g., an audio adapter and/or a speaker.

In some embodiments, computing system 620 includes a user input interface 658. In the exemplary embodiment, user input interface 658 is coupled to processor 652 and receives input from user 656. User input interface 658 may include, for example, a keyboard, a pointing device, a mouse, a stylus, and/or a touch sensitive panel, e.g., a touch pad or a touch screen. A single component, such as a touch screen, may function as both a display device of presentation interface 654 and user input interface 658.

Further, a communication interface 660 is coupled to processor 652 and is configured to be coupled in communication with one or more other devices such as, without limitation, another computing system 620, one or more turbines 105 (shown in FIG. 1), one or more sensors 115, 120 (shown in FIG. 1), monitoring system 150 (shown in FIG. 1), and any device capable of accessing computing system 620 including, without limitation, a portable laptop computer, a personal digital assistant (PDA), and a smart phone. Communication interface 660 may include, without limitation, a wired network adapter, a wireless network adapter, a mobile telecommunications adapter, a serial communication adapter, and/or a parallel communication adapter. Communication interface 660 may receive data from and/or transmit data to one or more remote devices. Computing system 620 may be web-enabled for remote communications, for example, with a remote desktop computer (not shown).

Also, presentation interface 654 and/or communication interface 660 are both capable of providing information suitable for use with the methods described herein, e.g., to user 656 or another device. Accordingly, presentation interface 654 and communication interface 660 may be referred to as output devices. Similarly, user input interface 658 and communication interface 660 are capable of receiving information suitable for use with the methods described herein and may be referred to as input devices.

Further, processor 652 and/or memory device 650 may also be operatively coupled to a storage device 662. Storage device 662 is any computer-operated hardware suitable for storing and/or retrieving data, such as, but not limited to, data associated with a database 664. In the exemplary embodiment, storage device 662 is integrated in computing system 620. For example, computing system 620 may include one or more hard disk drives as storage device 662. Moreover, for example, storage device 662 may include multiple storage units such as hard disks and/or solid state disks in a redundant array of inexpensive disks (RAID) configuration. Storage device 662 may include a storage area network (SAN), a network attached storage (NAS) system, and/or cloud-based storage. Alternatively, storage device 662 is external to computing system 620 and may be accessed by a storage interface (not shown).

Moreover, in the exemplary embodiment, database 664 contains a variety of static and dynamic operational data associated with monitoring data.

The embodiments illustrated and described herein as well as embodiments not specifically described herein but within the scope of aspects of the disclosure, constitute exemplary means for detecting rotor anomalies in, for example, turbines 105. For example, computing system 620, and any other similar computer device added thereto or included within, when integrated together, include sufficient computer-readable storage media that is/are programmed with sufficient computer-executable instructions to execute processes and techniques with a processor as described herein. Specifically, computing system 620 and any other similar computer device added thereto or included within, when integrated together, constitute an exemplary means for detecting rotor anomalies.

Figure 7:
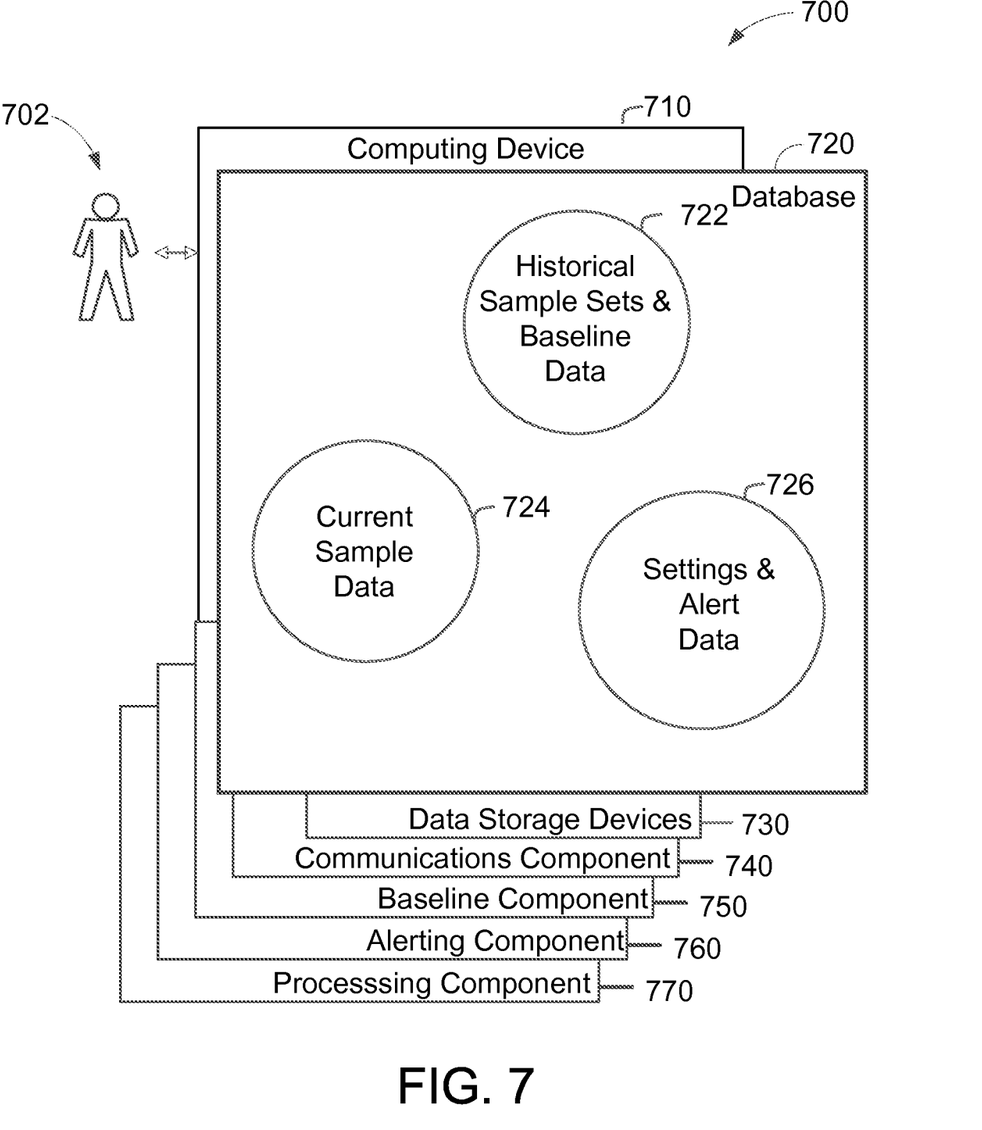
FIG. 7 illustrates an exemplary configuration of a database within a computing device, along with other related computing components, that may be used to detect rotor anomalies as described herein.

FIG. 7 illustrates an exemplary configuration 700 of a database 720 within a computing device 710, along with other related computing components, that may be used to detect rotor anomalies as described herein. Database 720 is coupled to several separate components within computing device 710, which perform specific tasks. In the exemplary embodiment, computing device 710 may be computing device 620 (shown in FIG. 6), monitoring unit 125 (shown in FIG. 1), and/or monitoring system 150 (shown in FIG. 1).

In the exemplary embodiment, database 720 includes historical sample sets & baseline data 722, current sample data 724, and settings & alert data 726. Historical sample sets & baseline data 722 includes information associated with the historical sample sets of turbine 105, including baseline sample sets. Current sample data 724 includes information associated with a current or recent transient speed operation of turbine 105. Settings & alert data 726 includes information associated with parameters that are used by computing device 710 to create baseline data, collect and process current sample data 724, and generate alerts.

Computing device 710 includes the database 720, as well as data storage devices 730. Computing device 710 also includes a communications component 740 for operations such as transmitting data to and from other computing devices. Computing device 710 also includes a baseline component 750 for operations such as processing sensor data to collect or otherwise generate baseline sample sets. An alerting component 760 is also included for operations such as processing current sample data 724 and generating alerts during transient speed operations. A processing component 770 assists with execution of computer-executable instructions associated with the system.

The embodiments illustrated and described herein, as well as embodiments not specifically described herein, but, within the scope of aspects of the disclosure, constitute exemplary means for detecting rotor anomalies during transient speed operations. For example, computing device 620, and any other similar computer device added thereto or included within, when integrated together, include sufficient computer-readable storage media that is/are programmed with sufficient computer-executable instructions to execute processes and techniques with a processor as described herein. Specifically, computing device 620 and any other similar computer device added thereto or included within, when integrated together, constitute an exemplary means for detecting rotor anomalies during transient speed operations.

An exemplary technical effect of the methods, systems, and apparatus described herein includes at least one of: (a) generating baseline sample sets from historical sensor measurements; (b) comparing current sensor samples to baseline sample sets during a transient speed operation; and (c) generating alerts based on differences detected between the current samples and the baseline sample sets.

Exemplary embodiments of systems and methods for detecting rotor anomalies during transient speed operations are described above in detail. The systems and methods described herein are not limited to the specific embodiments described herein, but rather, components of systems and/or steps of the methods may be utilized independently and separately from other components and/or steps described herein. For example, the methods may also be used in combination with other monitoring systems, and are not limited to practice with only the monitoring systems and methods as described herein. Rather, the exemplary embodiments can be implemented and utilized in connection with many other monitoring and communications applications.

Although specific features of various embodiments may be shown in some drawings and not in others, this is for convenience only. In accordance with the principles of the systems and methods described herein, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for detecting anomalies in a rotor during transient speed operations of a turbine, said system comprising:
   at least one vibration sensor operable to obtain a vibration measurement from a rotor during a transient speed operation of a turbine; and
   a local monitoring unit communicatively coupled to the at least one vibration sensor, the local monitoring unit storing historical sample sets including a plurality of vibration samples obtained during testing of transient speed operations of the rotor at a factory prior to deployment of the rotor outside the factory, and including a computing system configured to implement operations that comprise:
   identify a baseline sample set from among the historical sample sets, the baseline sample set computed from a plurality of historical sample sets obtained while performing a startup transient speed operation and a shutdown transient speed operation during the testing, wherein the baseline sample set includes a plurality of baseline samples associated with the rotor and each baseline sample includes a baseline sample vibration value and a baseline rotational speed value, such that the baseline sample set includes at least one baseline sample vibration value and at least one baseline rotational speed value captured at a speed hold point associated with the startup transient speed operation or the shutdown transient speed operation performed during the testing,
   collect a plurality of current vibration samples from at least one vibration sensor during a startup transient speed operation and a shutdown transient speed operation performed after completion of the testing and following deployment of the rotor outside the factory, the plurality of current vibration samples being sampled at predetermined intervals and each current vibration sample including a rotational speed measurement of the rotor and a vibration measurement,
   select, for each current vibration sample, one or more baseline samples, wherein the one or more baseline samples are selected from the baseline sample set based on including the baseline rotational speed value determined to be nearest the rotational speed measurement included in the plurality of current vibration samples,
   compare, for each current vibration sample, the vibration measurement to one or more baseline vibration values of the selected one or more baseline samples, and
   transmit an alert to a monitoring system based at least in part on the comparing.

2. The system of claim 1, wherein identifying a baseline sample set includes identifying a historical sample set as the baseline sample set, wherein the historical sample set includes a plurality of historical vibration samples of the rotor during a past transient speed operation.

3. The system of claim 1, wherein comparing the vibration measurement to one or more baseline vibration values further includes:
   averaging the one or more baseline vibration values to generate a baseline average; and
   comparing the vibration measurement to the baseline average.

4. The system of claim 1, wherein the vibration measurement includes an amplitude measurement and a phase measurement, wherein each baseline vibration value includes a baseline amplitude value and a baseline phase value, wherein comparing the vibration measurement to one or more baseline vibration values further includes:
   comparing the amplitude measurement to the baseline amplitude value; and
   comparing the phase measurement to the baseline phase value.

5. The system of claim 1, wherein identify a baseline sample set includes receiving, from an operator of said computing system, an indication of a historical sample set as the baseline sample set, wherein the historical sample set includes a plurality of historical vibration samples of the rotor during a past transient speed operation.

6. The system of claim 1, wherein the baseline sample set is identified among the historical sample sets prior to shipping the rotor from the factory and is computed from the plurality of historical sample sets obtained during factory testing.

7. A computer-based method for detecting anomalies in a rotor during transient speed operations of a turbine, said method comprising:
storing, in a memory of a computing device, historical sample sets including a plurality of vibration samples obtained during testing of transient speed operations of the rotor at a factory prior to deployment of the rotor outside the factory;
identifying, in the computer memory, a baseline sample set from among the historical sample sets prior to shipping the rotor from the factory, the baseline sample set computed from a plurality of historical sample sets obtained while performing a startup transient speed operation and a shutdown transient speed operation during the testing, wherein the baseline sample set includes a plurality of baseline samples associated with the rotor and each baseline sample includes a baseline sample vibration value and a baseline rotational speed value, such that the baseline sample set includes at least one baseline sample vibration value and at least one baseline rotational speed value captured at a speed hold point associated with the startup transient speed operation or the shutdown transient speed operation performed during the testing;
operating a turbine including the rotor through a startup transient speed operation and a shutdown transient speed operation following the testing and measuring, using at least one vibration sensor, vibrations of the rotor during the transient speed operations at predetermined intervals;
collecting a plurality of current vibration samples from the measured vibrations during a startup transient speed operation and a shutdown transient speed operation performed after completion of the testing and following deployment of the rotor outside the factory, the plurality of current vibration samples including a current vibration sample including a rotational speed measurement of the rotor and a vibration measurement;
selecting, for each current vibration sample, one or more baseline samples, wherein the one or more baseline samples are selected from the baseline sample set based on including the baseline rotational speed value determined to be nearest the rotational speed measurement included in the plurality of current vibration samples;
comparing, for each current vibration sample, by the processor, the vibration measurement to one or more baseline vibration values of the selected one or more baseline samples; and
transmitting an alert to a monitoring device based at least in part on the comparing.

8. The method of claim 7, wherein identifying a baseline sample set includes identifying a historical sample set as the baseline sample set, wherein the historical sample set includes a plurality of historical vibration samples of the rotor during a past transient speed operation.

9. The method of claim 7, wherein comparing the vibration measurement to one or more baseline vibration values further includes:
averaging the one or more baseline vibration values to generate a baseline average, and
comparing the vibration measurement to the baseline average.

10. The method of claim 7, wherein the vibration measurement includes an amplitude measurement and a phase measurement, wherein each baseline vibration value includes a baseline amplitude value and a baseline phase value, wherein comparing the vibration measurement to one or more baseline vibration values further includes:
comparing the amplitude measurement to the baseline amplitude value, and
comparing the phase measurement to the baseline phase value.

11. The method of claim 7, wherein identifying a baseline sample set includes receiving, from an operator of the computing device, an indication of a historical sample set as the baseline sample set, wherein the historical sample set includes a plurality of historical vibration samples of the rotor during a past transient speed operation.

12. A system for detecting anomalies in a rotor during transient speed operations of a turbine, said system comprising:
at least one vibration sensor operable to obtain a vibration measurement from a rotor during transient speed operations of a turbine;
a remote monitoring system located offsite from the turbine; and
a local monitoring unit communicatively coupled to the at least one vibration sensor and the remote monitoring system, the local monitoring unit including at least one processor and at least one non-transitory computer-readable storage media storing historical sample sets including a plurality of vibration samples obtained during testing of transient speed operations of the rotor at a factory prior to deployment of the rotor outside the factory, and having computer-executable instructions embodied thereon, wherein when executed by the at least one processor, the computer-executable instructions cause the processor to:
identify a baseline sample set from among the historical sample sets, the baseline sample set computed from a plurality of historical sample sets obtained while performing a startup transient speed operation and a shutdown transient speed operation during the testing, wherein the baseline sample set includes a plurality of baseline samples associated with a rotor and each baseline sample includes a baseline sample vibration value and a baseline rotational speed value, such that the baseline sample set includes at least one baseline sample vibration value and at least one baseline rotational speed value captured at a speed hold point associated with the startup transient speed operation or the shutdown transient speed operation performed during the testing,
such that the baseline sample set includes at least one baseline sample vibration value and at least one baseline rotational speed value captured at a speed hold point associated with the startup transient speed operation or the shutdown transient speed operation performed during the testing,
collect a plurality of current vibration samples from at least one vibration sensor during a startup transient speed operation and a shutdown transient speed operation of the rotor performed after completion of the testing and following deployment of the rotor outside the factory, the plurality of current vibration samples being sampled at predetermined intervals and each current vibration sample including a rotational speed measurement of the rotor and a vibration measurement, select, for each current vibration sample, one or more baseline samples, wherein the one or more baseline samples are selected from the baseline sample set based on including the baseline rotational speed value determined to be nearest the rotational speed measurement included in the plurality of current vibration samples, compare, for each current vibration sample, the vibration measurement to one or more baseline vibration values of the selected one or more baseline samples, and transmit an alert to the remote monitoring system based at least in part on the comparing.

13. The system of claim 12, wherein identifying a baseline sample set includes identifying a historical sample set as the baseline sample set, wherein the historical sample set includes a plurality of historical vibration samples of the rotor during a past transient speed operation.

14. The system of claim 12, wherein comparing the vibration measurement to one or more baseline vibration values further includes:
   averaging the one or more baseline vibration values to generate a baseline average, and
   comparing the vibration measurement to the baseline average.

15. The system of claim 12, wherein the vibration measurement includes an amplitude measurement and a phase measurement, wherein each baseline vibration value includes a baseline amplitude value and a baseline phase value, wherein comparing the vibration measurement to one or more baseline vibration values further includes:
   comparing the amplitude measurement to the baseline amplitude value, and
   comparing the phase measurement to the baseline phase value.

* * * * *